United States Patent Office 3,409,718
Patented Nov. 5, 1968

3,409,718
METHODS OF REPELLING BIRDS WITH THE RESINOUS AMINATION PRODUCT OF CROTONALDEHYDE AND DIETHYLAMINE
Andrew J. Reinert, Kenneth E. Cantrel, and Harold R. Deck, Bartlesville, Okla., assignors to Phillips Petroleum Company, a corporation of Delaware
No Drawing. Filed Nov. 29, 1965, Ser. No. 510,401
5 Claims. (Cl. 424—82)

ABSTRACT OF THE DISCLOSURE

This invention is concerned with repelling birds with the resinous amination product of crotonaldehyde and diethylamine.

---

This invention relates to bird repellents. In one aspect, this invention relates to methods of rendering a locus repellent to birds. In another aspect, this invention relates to novel bird repellent compositions.

The problem of deterring birds from resting on window sills, roofs, and ledges of buildings has become increasingly difficult. Property owners, especially in large metropolitan areas, spend thousands of dollars each year to clean buildings which have been used a resting places for such birds as starlings, pigeons, sparrows and the like. Although devices such as scarecrows, noisemakers, etc. have been used with moderate success for discouraging birds from resting in open fields and the like, these devices are not suitable for use on or near large buildings which afford a variety of different resting places for birds. Moreover, it frequently happens that birds become so accustomed to devices of this type that they are no longer effective for discouraging birds from landing.

In the practice of this invention, birds are discouraged from resting on a locus by applying a novel bird repellent composition to the locus. The novel bird repellent composition which we have discovered for this purpose is the reaction product obtained by reacting an unsaturated aldehyde and an amine.

Accordingly, it is an object of this invention to provide a novel bird repellent composition.

Another object of this invention is to provide an effective method of rendering a locus repellent to birds.

A further object of this invention is to provide a simple and efficient method of preventing birds from resting on a particular locus.

These and other objects of the invention will become apparent to one skilled in the art after studying the following detailed description and the appended claims.

According to the present invention, a locus can be rendered repellent to birds by applying to said locus the reaction product obtained by reacting an unsaturated aldehyde and an amine. The term amine as used herein is intended to include ammonia.

The alpha, beta-unsaturated aldehyde which can be used as a starting material in the preparation of the novel bird repellent compounds of this invention can be represented by the structural formula

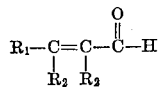

wherein $R_1$ can contain up to about 12 carbon atoms and is selected from the group consisting of hydrogen, alkyl, aryl, cycloalkyl, and combinations thereof such as aralkyl, alkaryl, and the like; and wherein each $R_2$ is selected from the group consisting of hydrogen, methyl, and ethyl.

Exemplary unsaturated aldehydes defined by the above formula include:

propenal (acrolein)
2-methylpropenal
2-butenal (crotonaldehyde)
2-methyl-2-butenal
3-methyl-2-pentenal
2,3-diethyl-2-pentenal
2,3-dimethyl-4-phenyl-2-butenal
2-methyl-3-ethyl-4-phenyl-2-pentenal
3-methyl-4-cyclopentyl-2-butenal
5-(2,4-dimethylphenyl)-2-pentenal
6-cyclohexyl-2-hexenal
4-(2-naphthyl)-2-butenal
6-ethyl-2-decenal
3-methyl-2-heptenal
2-ethyl-2-hexenal
2-pentenal
2,3-diethyl-2-pentadecenal
and the like.

The amine which can be reacted with the unsaturated aldehyde to produce the novel bird repellent compounds of this invention includes ammonia and primary or secondary amines as represented by the formula

wherein $R_3$ is selected from the group consisting of hydrogen, alkyl, aryl, cycloalkyl, and combinations thereof such as alkaryl, aralkyl, and the like; wherein $R_4$ is selected from the group consisting of hydrogen, alkyl, aryl, cycloalkyl, and combinations thereof such as alkaryl, aralkyl, and the like; and wherein the total number of carbon atoms represented by $R_3$ and $R_4$ does not exceed about 12. $R_3$ and $R_4$ together with other atoms can form a heterocyclic ring.

Exemplary amines defined by the above structural formula include ammonia, methylamine, n-propylmethylamine, dibutylamine, aniline, diphenylamine, N-methylaniline, toluidines, benzylamine, morpholine, cyclohexylamine, cyclopropylamine, piperidine, xylidines, dicyclohexylamine, N-butyl-sec-octylamine, di-n-hexylamine, N-methyl-tert-undecylamine, and the like.

The bird repellent compounds of this invention can be prepared by reacting the unsaturated aldehyde and the amine in accordance with any suitable aminating procedure. Suitable catalytic materials can be used to promote the amination reaction if desired. Preferably, the reaction is conducted in the presence of an inert diluent.

Although the invention is not to be bound by any particular technique for conducting the amination reaction, the reaction can be conducted in two separate stages by forming an intermediate compound at the conclusion of the first stage. In preparing the novel bird repellent compounds by this procedure, the unsaturated aldehyde and the amine are contacted together in a first stage at a temperature within the range of about −80 to about +50° C. for a period of time sufficient to form an intermediate. The duration of the first stage of the reaction can vary widely within the range of from about a few minutes to about 30 hours or more. The mol ratio of the amine to the unsaturated aldehyde should be at least about 1:1 and preferably at least about 2:1. The reaction can be conducted at any convenient pressure. Any known promoter in the art can be used to catalyze the amination reaction. Potassium carbonate can be used for this purpose if desired. Any inert diluent can be used including nonpolar solvents such as benzene, toluene, xylenes or lower paraffinic or cycloparaffinic hydrocarbons having up to about 12 carbon atoms per molecule. Mixtures of the foregoing solvents can also be used if desired.

The intermediate formed by the first stage of the reaction can be separated, if desired, from any promoter which may have been used. For example, potassium carbonate promoter can be removed by filtration. The resulting product can then be distilled to remove the diluent and any excess amine. Although such purification of the intermediate is preferred, it is not essential to the invention.

The intermediate material is then subjected to a heat treatment at temperatures between about 50 to about 200° C. or more for a period of time from a few minutes up to about 10 hours or more. It is preferred to conduct the heat treatment under conditions of reduced pressure to promote removal of volatiles.

It is also within the spirit and scope of this invention to combine the two separate stages of the reaction into one stage which includes both the contacting stage and the heating stage. In accordance with this method of preparation, the reactants are contacted at a temperature in the range of about 50 to about 200° C. or higher for a period of time ranging from a few minutes to about 30 hours or more, or until such time sufficient to produce the desired reaction product. Other materials such as reaction diluents or excess reagents which may be present in the final product can be removed by conventional methods such as by evaporation, solvent extraction, and the like.

The resulting product which can be recovered and used as an effective bird repellent in accordance with this invention is generally in the form of a dark resinous substance. The product can be applied to a surface from which birds are to be repelled as a pure compound or in solution in an inert solvent. Suitable inert solvents which can be used for this purpose include acetone, kerosene, ethyl acetate, and isoparaffinic hydrocarbons which boil in the range of about 260 to about 800° F. The bird repellent compounds can also be applied to the locus in admixture with water in the form of an aqueous emulsion containing a suitable emulsifying agent. The novel repellent compounds can also be applied to the locus as a dust or powder in admixture with a solid carrier such as kieselguhr. The repellent and the carrier can be admixed with a suitable adhesive thereby prolonging the adherency of the compound to the locus. The use of an adhesive is generally preferred when the compound is applied to exposed ledges and window sills of the buildings because it will be less affected by the action of rain and wind.

The novel compounds of this invention can be applied to the locus in the previously described forms by spraying, brushing, dusting, and the like. Suitable aerosol containers having an inert propellent can also be used for conveniently dispensing the compounds. The compounds are particularly suited for dispensing in a spray because of the extremely uniform application which results. When the compounds are dissolved in an inert solvent, the mixture generally can contain from about 0.5 to 50 weight percent of the compound. When the compound is dispersed in a solid carrier, the compound is generally present in an amount within the range of about 0.5 to about 20 weight percent based upon the total weight of the mixture. Although these ranges have been proven to be effective for repelling birds when applied to a locus, concentrations above and below these ranges can be used if desired. As a general rule, it is desirable to provide the locus with the compounds in a concentration of about 0.1 to about 10 grams per square foot of surface area. Concentrations above and below this range can be used if desired.

Several runs were conducted to prepare the novel bird repellent compounds of this invention. In a typical reaction, 53 grams of crotonaldehyde were charged to a reaction flask along with 75 milliliters of benzene and 30 grams of potassium carbonate promoter. Approximately 112.5 grams of diethylamine were added to the reaction flask dropwise over a period of about 25 minutes during which the temperature of the materials in the flask was maintained in the range of 0 to 5° C. The reactants were agitated for one hour at this temperature, and then allowed to stand overnight at room temperature. The mixture was filtered the next day to remove residual potassium carbonate promoter. A small amount of hydroquinone stabilizer was added to the intermediate compound. The benzene, excess diethylamine, and other volatiles were removed under reduced pressure. The intermediate reaction product was then heated at a temperature of about 100° C. for a period of about 1 hour. The dark resinous substance recovered was analyzed and found to contain about 4.9 weight percent nitrogen. This compound was tested as a bird repellent. The following examples will serve to illustrate the effectiveness of the compounds of this invention.

EXAMPLE I

A cage 8 feet long was constructed with trapezoidal-shaped ends which measured 6 inches wide at the bottom, 3 feet wide at the top, and 1½ feet wide at a point midway between the top and bottom. A roosting bar was attached to the interior surface of the sides such that it extended over the entire width of the cage. A system for exhausting air was attached to one end of the cage, and the opposite end of the cage was provided with a screen covered by a curtain which would allow air but not light to pass into the cage. A plurality of translucent panels were positioned on the top surface of the cage in order to allow diffused light to enter. This type of cage simulated natural roosting conditions for birds. A plurality of wires of small diameter were placed across the cage just above the bottom surface to discourage roosting in any other place but the roosting bar.

In order to test the effectiveness of the compounds of this invention, two starlings were released in the cage and their conduct observed. After the starlings had become accustomed to their surroundings, it was determined they spent approximately 95 percent of the time on the roosting bar. A roosting index defined as the ratio of time spent by the birds on the roosting bar to the total elapsed time was used to determine the utility and effectiveness of the compounds. A prefect bird repellent will result in a roost index of zero. On the basis of data reflecting the activity of the starlings without any compound on the roosting bar, the roosting index was calculated to be in excess of 0.9.

Three separate tests were conducted using the crotonaldehyde-diethylamine reaction product on the roosting bar with two starlings in each test. In all three tests, the reaction product was deposited on the roosting bar at a coverage calculated to be about 8 grams per square foot of roosting surface and the roost index as hereinbefore defined was determined. The results are reported in Table I below.

*Table 1*

Cronaldehyde-diethylamine
| reaction product: | Roost index |
|---|---|
| Run 1 | 0.03 |
| Run 2 | 0.007 |
| Run 3 | 0.11 |

It can be seen from the data above that the unsaturated aldehyde-amine reaction product of the invention is very effective as a bird repellent. Although the cage was constructed to simulate actual roosting conditions, the starlings did not have as much freedom in selecting a place to rest as they would have in their natural environment. If the choice of resting places would have been greater, the roosting indexes for this compound would have undoubtedly been lower.

EXAMPLE II

A portion of the crotonaldehyde-diethylamine amination reaction product was field tested to determine its effectiveness as a bird repellent under actual conditions over long periods of time. A shed which had been used for a shelter for cattle was found to be a popular resting place for a flock of over 1,000 starlings each night. The starlings rested on open beams located beneath the roof of the shed. The amination reaction product of this invention was applied to the beams as a 25 weight per cent solution in acetone by means of a paint brush at a coverage estimated at about 0.1 to 10 grams per square foot. The conduct of the starlings was observed over a period of several weeks. On the first night, the number of starlings which used the shed as a roost decreased by about 80 percent. At the end of the sixth night, there were no starlings roosting on the beams. Random observations over a period of about five weeks revealed no starlings were roosting on the beams, thus illustrating that the compound continued to be 100 percent effective.

Although the invention has been described in considerable detail, it is to be understood that many variations and modifications can be made without departing from the spirit and scope thereof.

We claim:

1. A method of repelling birds from a locus, which method comprises: applying to said locus an effective amount of the resinous amination reaction product obtained by contacting crotonaldehyde and diethylamine at a mol ratio of amine to aldehyde of about 2:1, at a temperature within the range of about 0 to about 5° C., for a period of time of about one hour; and heating the resulting product at a temperature of about 100° C. for about 1 hour to obtain said reaction product; whereby said birds are repelled from said locus.

2. A method according to claim 1 wherein: in the presence of benzene as a diluent and potassium carbonate as a promoter; the resulting reaction mixture is allowed to stand overnight at room temperature; said potassium carbonate, said benzene, and said excess diethylamine and other volatile materials are removed from said reaction mixture; and the remaining product is then heated at a temperature of about 100° C. for about one hour to obtain said reaction product.

3. A method according to claim 1 wherein the reaction product is applied to said locus in the form of a dust dispersed in kieselguhr.

4. A method according to claim 1 wherein the reaction product is applied to said locus by means of a liquid carrier selected from the group consisting of water, acetone, kerosene, ethyl acetate, and isoparaffinic hydrocarbons which boil in the range of from about 260 to about 800° F.

5. A method according to claim 1 wherein the reaction product is applied in an amount to provide about 0.01 to about 10 grams of product per square foot of said locus.

References Cited

UNITED STATES PATENTS 3,271,247   9/1966   Reinert et al. _____ 167—46

ALBERT T. MEYERS, *Primary Examiner.*

S. FRIEDMAN, *Assistant Examiner.*